(12) United States Patent
Gopalakrishna et al.

(10) Patent No.: US 7,715,322 B2
(45) Date of Patent: May 11, 2010

(54) SYSTEMS AND METHODS FOR THE IMPLEMENTATION OF A REMOTE TEST ACCESS FEATURE USING VIRTUAL CONNECTION POINTS AND SUB-NETWORK CONNECTIONS

(75) Inventors: Satish Gopalakrishna, Alpharetta, GA (US); Frederick Nick Genthner, Alpharetta, GA (US); Goran Bjelcevic, Roswell, GA (US); Neena Aluri, Alpharetta, GA (US)

(73) Assignee: Ciena Corporation, Linthicum, MD (US)

( * ) Notice: Subject to any disclaimer, the term of this patent is extended or adjusted under 35 U.S.C. 154(b) by 472 days.

(21) Appl. No.: 11/716,146

(22) Filed: Mar. 9, 2007

(65) Prior Publication Data

US 2008/0219171 A1 Sep. 11, 2008

(51) Int. Cl.
*H04L 12/26* (2006.01)
*G06F 15/173* (2006.01)
(52) U.S. Cl. .................................... 370/250; 709/224
(58) Field of Classification Search ................... None
See application file for complete search history.

(56) References Cited

U.S. PATENT DOCUMENTS

2003/0218984 A1* 11/2003 Tanaka ....................... 370/248
2006/0198315 A1* 9/2006 Sasagawa et al. ........... 370/244
2007/0053303 A1* 3/2007 Kryuchkov .................. 370/250
2008/0101401 A1* 5/2008 Storry et al. ................ 370/463

* cited by examiner

*Primary Examiner*—Ricky Ngo
*Assistant Examiner*—Clemence Han
(74) *Attorney, Agent, or Firm*—Clements Bernard PLLC; Christopher L. Bernard; Tyler S. Brown

(57) ABSTRACT

Systems and methods for the implementation of a remote test access feature using virtual connection points and sub-network connections by the merge-and-split of flexible permanent virtual circuits. A sub-network connection is created between a remote test set and a connection termination point of a circuit of interest through the provision of two endpoints of interest. Subsequently, monitoring and management capabilities are established and operation, administration, and maintenance functions are performed at a centralized location using a network management system. The remote tap used may employ any protection scheme and mesh restore, as necessary, either manually or automatically, in the event of signal degrade or failure scenarios. The endpoint of the remote tap may be selectively changed, and the remote tap re-groomed for a different circuit of interest via a simple point-and-click.

21 Claims, 5 Drawing Sheets

SYSTEMS AND METHODS FOR THE IMPLEMENTATION OF A REMOTE TEST ACCESS FEATURE USING VIRTUAL CONNECTION POINTS AND SUB-NETWORK CONNECTIONS

FIELD OF THE INVENTION

The present invention relates generally to the telecommunications and optical networking fields. More specifically, the present invention relates to systems and methods for the implementation of a remote test access feature using virtual connection points (VCPs) and sub-network connections (SNCs) by the merge-and-split of flexible cross-connects.

BACKGROUND OF THE INVENTION

Providing a test capability in the network elements (NEs) of a transport network involves offering transport network operators a mechanism with which to observe, diagnose, isolate, and fix problems with the individual circuits associated with the transport network. A key attribute of this test capability is that it must enable access to a given end-to-end circuit without requiring the customer premises equipment (CPE) devices to be disconnected from their respective NE ports for the purpose of connecting test devices. In order to provide this test capability, digital cross-connect system (DCS) NEs include ports known as test access ports (TAPs). These TAPs are used to mirror the data flows at the various network interfaces. Thus, the DCSs integrate digital test access unit (DTAU) functions into the NEs themselves. The TAPs are connected to test units (TUs) for the purpose of monitoring the data flows, and may be used to inject traffic either towards an end-user or towards interior NEs within the transport network.

Various standards specify two distinct types of TAPs: (1) local TAPs and (2) remote TAPs. The local TAPs are used for connecting test devices to a NE and diagnosing circuits on that same NE. The remote TAPs, on the other hand, are connected to remote test units (RTUs). These RTUs are termed "remote" only because they are physically separated from the test operations systems (TOSs) that are used for testing. In all other aspects, local TAPs and remote TAPs are functionally equivalent. The TOSs communicate with a test system controller (TSC)/RTU via a control link to initiate test access. The standards do not specify the type of connection between the TSC and the RTU.

Disadvantageously, conventional remote test access features require manual cross-connects to be set up at every node that is needed to complete the network connection between the remote test set and the circuit of interest. This requires the transport network operator to login to every node and set up the cross-connect. If there is any traffic degradation or failure at any of the connection termination points (CTPs), there is no protection mechanism for the remote tap, and, as a result, the remote tap is not able to reach the circuit of interest. If it is desired to use the same remote tap to reach different circuits of interest using the same remote test set, all of the cross-connects that are set up must be torn down, and set up again. If the circuit of interest is modified, as in the case of protecting it or making it drop-and-continue, the remote tap is lost. Finally, the remote tap is inherently bidirectional. As a result, monitor modes are not supported.

Thus, what are needed are systems and methods for the implementation of a remote test access feature using VCPs and SNCs by the merge-and-split of flexible cross-connects, thereby addressing the disadvantages described above.

BRIEF SUMMARY OF THE INVENTION

In various exemplary embodiments, the present invention provides systems and methods for the implementation of a remote test access feature using VCPs and SNCs by the merge-and-split of flexible cross-connects, thereby addressing the disadvantages described above. The remote test access feature of the present invention represents a highly flexible and fully automated technique that utilizes and exploits a network cloud. A SNC is created between a remote test set and a CTP of a circuit of interest through the provision of two endpoints of interest. Subsequently, monitoring and management capabilities are established and operation, administration, and maintenance (OAM) functions are performed at a centralized location using a network management system (NMS). The remote tap used may employ any protection scheme and mesh restore, as necessary, either manually or automatically, in the event of signal degrade or failure scenarios. The endpoint of the remote tap may be selectively changed, and the remote tap re-groomed for a different circuit of interest via a simple point-and-click. Thus, problems anywhere in the transport network may be tracked down.

The remote test access feature of the present invention utilizes and exploits the merge-and-split of flexible cross-connects, using the merge-and-split concept of graph theory. When the circuit of interest is modified, the associated flexible cross-connects are modified and merged again. When the remote tap is mesh restored, the remaining part of the graph is modified and merged again transparently, such that the remote test "sees" only a small traffic disruption, as opposed to a complete traffic loss, as is the case with conventional test access features. Finally, the remote test access feature of the present invention supports unidirectional (and bidirectional) cross-connects and, as a result, provides monitor modes for remote testing on both the facility and equipment sides of a CTP of a circuit of interest.

In one exemplary embodiment, the present invention provides a system for the implementation of a remote test access feature in a transport network using virtual connection points and sub-network connections, the system including: a first network element representing a remote test node; a second network element representing a local node to be tested, the second network element including a circuit to be tested; a digital test set including diagnostic equipment coupled to the first network element; one or more software-based virtual test access links coupling the first network element and the second network element via one or more local test access ports associated with the local node to be tested and the circuit to be tested, the one or more software-based virtual test access links each including one or more software-based virtual connection points, the one or more software-based virtual connection points each defining a connection point for a unidirectional traffic path originating/terminating on the same or a different network element; and one or more sub-network connections coupling the first network element and the second network element, the one or more sub-network connections each including one or more cross-connects defining an end-to-end path through the transport network. The system also includes a test operations system coupled to the digital test set and the remote test node via a first communications link. The system further includes a network management system coupled to the remote test node and the local node to be tested via a second communications link. Optionally, the digital test set is coupled to the first network element via a hardware-based test access link. Optionally, the one or more sub-network connections are resident in a network cloud. In one scenario, the remote test node and the local node to be tested are adjacent nodes, with no intervening nodes. In another scenario, the remote test node and the local node to be tested are not adjacent nodes, with intervening nodes.

In another exemplary embodiment, the present invention provides a method for the implementation of a remote test access feature in a transport network using virtual connection points and sub-network connections, the method including: providing a first network element representing a remote test node; providing a second network element representing a local node to be tested, the second network element including a circuit to be tested; providing a digital test set including diagnostic equipment coupled to the first network element; providing one or more software-based virtual test access links coupling the first network element and the second network element via one or more local test access ports associated with the local node to be tested and the circuit to be tested, the one or more software-based virtual test access links each including one or more software-based virtual connection points, the one or more software-based virtual connection points each defining a connection point for a unidirectional traffic path originating/terminating on the same or a different network element; and providing one or more sub-network connections coupling the first network element and the second network element, the one or more sub-network connections each including one or more cross-connects defining an end-to-end path through the transport network. The method also includes providing a test operations system coupled to the digital test set and the remote test node via a first communications link. The method further includes providing a network management system coupled to the remote test node and the local node to be tested via a second communications link. Optionally, the digital test set is coupled to the first network element via a hardware-based test access link. Optionally, the one or more sub-network connections are resident in a network cloud. In one scenario, the remote test node and the local node to be tested are adjacent nodes, with no intervening nodes. In another scenario, the remote test node and the local node to be tested are not adjacent nodes, with intervening nodes.

In a further exemplary embodiment, the present invention provides the present invention provides a method for the implementation of a remote test access feature in a transport network using virtual connection points and sub-network connections, the method including: providing a first network element representing a remote test node; providing a second network element representing a local node to be tested, the second network element including a circuit to be tested; providing a digital test set including diagnostic equipment coupled to the first network element; providing one or more software-based virtual test access links coupling the first network element and the second network element via one or more local test access ports associated with the local node to be tested and the circuit to be tested, the one or more software-based virtual test access links each including one or more software-based virtual connection points, the one or more software-based virtual connection points each defining a connection point for a unidirectional traffic path originating/terminating on the same or a different network element; wherein the one or more software-based virtual test access links are formed via the merging of a plurality of child cross-connect graphs to form a parent cross-connect graph; and providing one or more sub-network connections coupling the first network element and the second network element, the one or more sub-network connections each including one or more cross-connects defining an end-to-end path through the transport network. The method also includes providing a test operations system coupled to the digital test set and the remote test node via a first communications link. The method further includes providing a network management system coupled to the remote test node and the local node to be tested via a second communications link. Optionally, the digital test set is coupled to the first network element via a hardware-based test access link. Optionally, the one or more sub-network connections are resident in a network cloud. In one scenario, the remote test node and the local node to be tested are adjacent nodes, with no intervening nodes. In another scenario, the remote test node and the local node to be tested are not adjacent nodes, with intervening nodes.

BRIEF DESCRIPTION OF THE DRAWINGS

The present invention is illustrated and described herein with reference to the various drawings, in which like reference numbers are used to denote like system components and method steps, as appropriate, and in which.

DETAILED DESCRIPTION OF THE INVENTION

In various exemplary embodiments, the present invention provides systems and methods for the implementation of a remote test access feature using VCPs and SNCs by the merge-and-split of flexible cross-connects, thereby addressing the disadvantages described above. The remote test access feature of the present invention represents a highly flexible and fully automated technique that utilizes and exploits a network cloud. A SNC is created between a remote test set and a CTP of a circuit of interest through the provision of two endpoints of interest. Subsequently, monitoring and management capabilities are established and operation, administration, and maintenance (OAM) functions are performed at a centralized location using a network management system (NMS). The remote tap used may employ any protection scheme and mesh restore, as necessary, either manually or automatically, in the event of signal degrade or failure scenarios. The endpoint of the remote tap may be selectively changed, and the remote tap re-groomed for a different circuit of interest via a simple point-and-click. Thus, problems anywhere in the transport network may be tracked down.

The remote test access feature of the present invention utilizes and exploits the merge-and-split of flexible cross-connects, using the merge-and-split concept of graph theory. When the circuit of interest is modified, the associated flexible cross-connects are modified and merged again. When the remote tap is mesh restored, the remaining part of the graph is modified and merged again transparently, such that the remote test "sees" only a small traffic disruption, as opposed to a complete traffic loss, as is the case with conventional test access features. Finally, the remote test access feature of the present invention supports unidirectional cross-connects and, as a result, provides monitor modes for remote testing on both the facility and equipment sides of a CTP of a circuit of interest.

Figure 1:
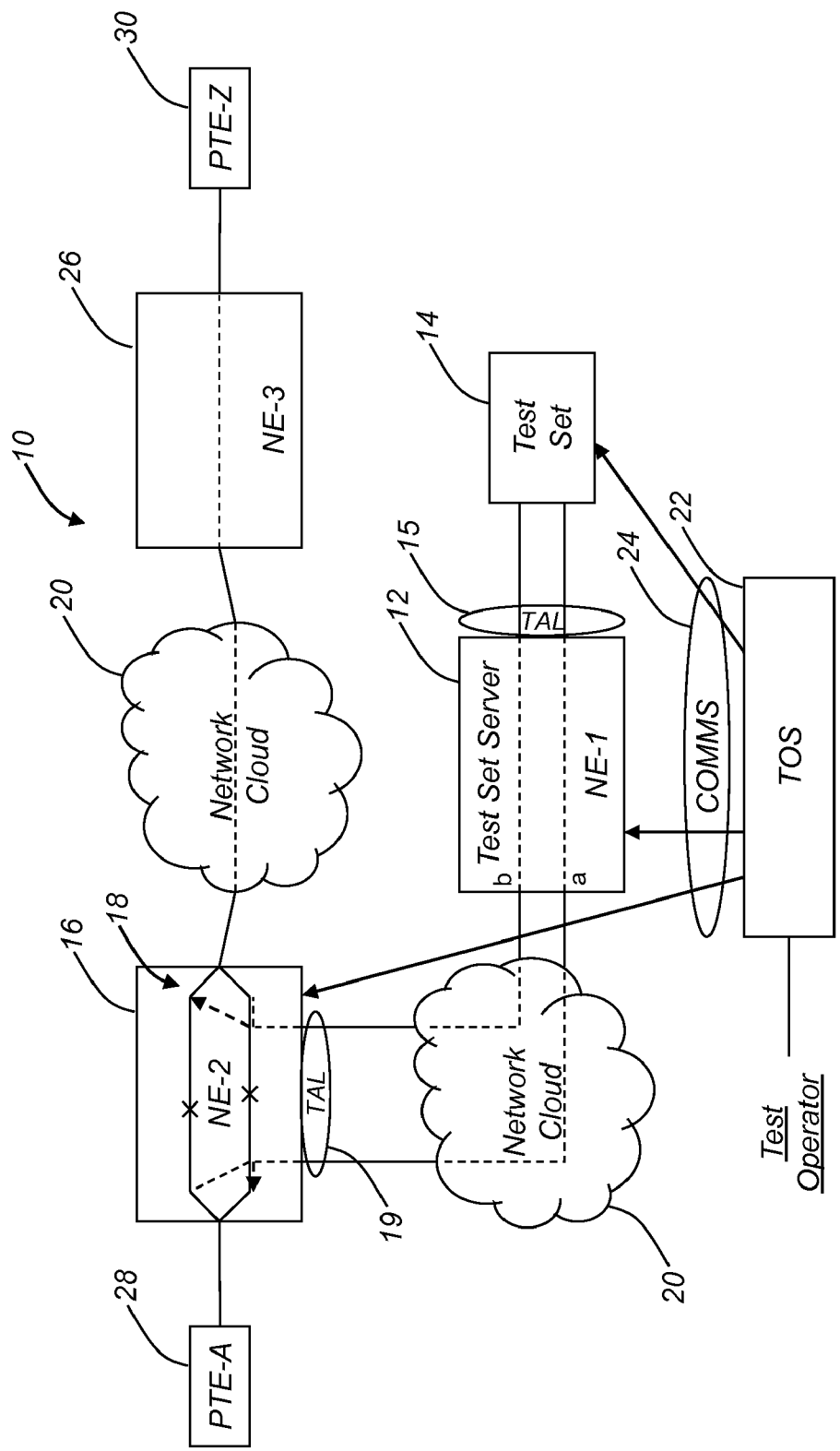
FIG. 1 is a schematic diagram illustrating a generic system and method for the implementation of a remote test access feature.

FIG. 1 is a schematic diagram illustrating a generic system and method 10 for the implementation of a remote test access feature. Referring to FIG. 1, in one embodiment, NE-1 12 is co-located with a digital test set 14 including diagnostic equipment, etc., via a test access link (TAL) 15. In this example, NE-1 12 is a remote test node representing a test set server, and could be located at corporate headquarters, for example. NE-2 16, which is located elsewhere, is co-located with a circuit of interest 18. In order for the digital test set 14 to access the circuit of interest 18, NE-2 16 must implement a local test access procedure. This local test access procedure involves connecting the circuit of interest 18 to a pair of unused local TAPs on NE-2 16. Likewise, the digital test set 14 is connected to a pair of unused local TAPs on NE-1 12. Thus, a second TAL 19 is formed. Using a cross-connected path across the DCS, the NE-1 TAPs and NE-2 TAPs are connected, forming the remote test access from the digital test set 14 to the circuit of interest 18. This last step must be repeated for every intervening node in the network cloud 20. It should be noted that the network cloud 20 is not used for a direct tap. The operation of the digital test set 14, NE-1 12, and NE-2 16 are directed by the TOS 22 through a communications link 24. Although not specifically addressed here, the transport network may also include NE-3 26, etc., in the network cloud 20 disposed between PTE-A 28 and PTE-Z 32.

Figure 2:
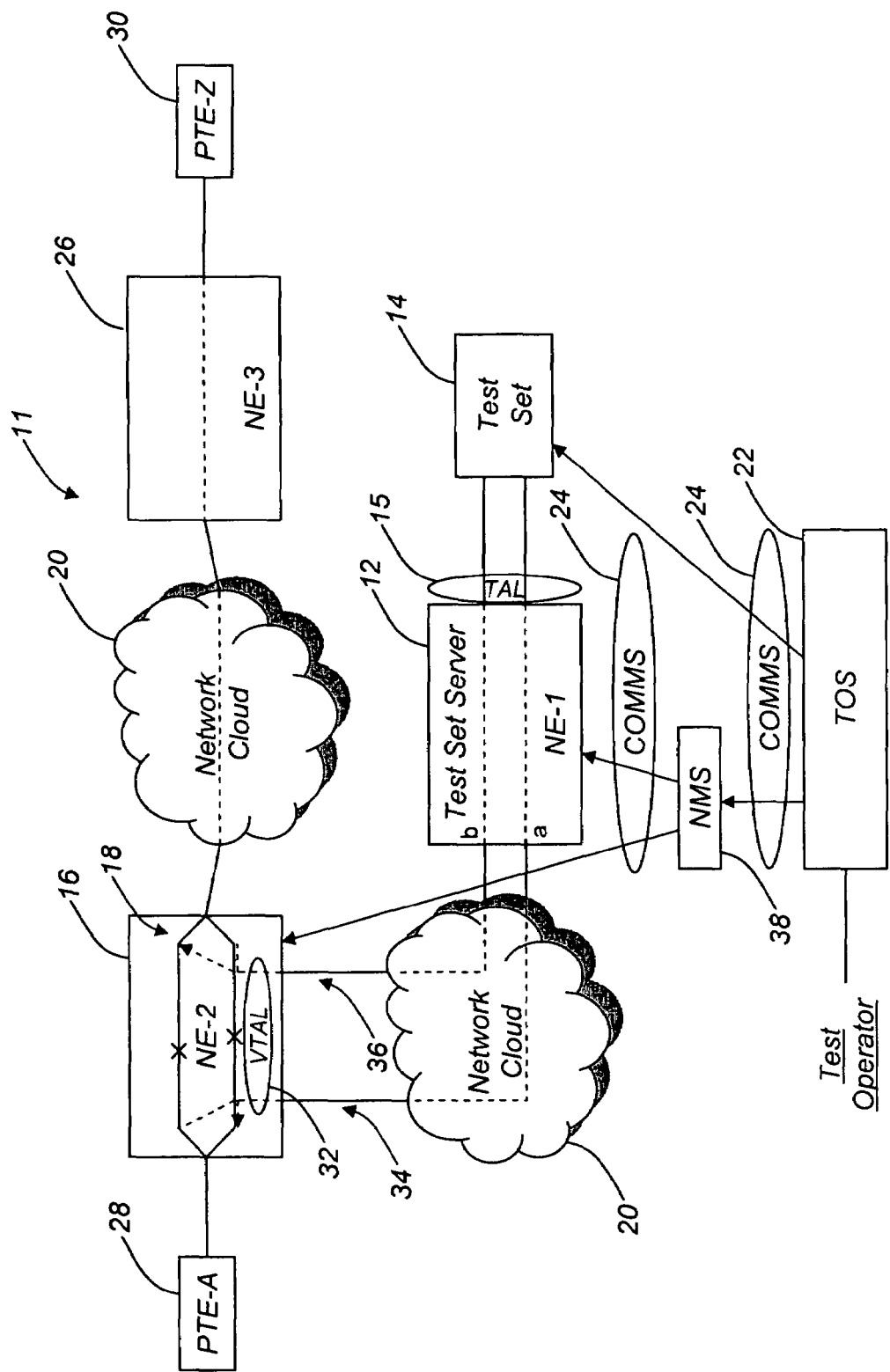
FIG. 2 is a schematic diagram illustrating a novel system and method for the implementation of a remote test access feature.

FIG. 2 is a schematic diagram illustrating a novel system and method 11 for the implementation of a remote test access feature. Referring to FIG. 2, in another embodiment, the platform of the present invention supports the creation of virtual test access links (VTALs) 32. A VTAL 32 is a software-based entity that represents a collection of VCPs. As such, a VTAL 32 is equivalent in its functionality to the TALs 15, 19 described above and in the various standards. However, a VTAL 32, unlike the TALs 15, 19 does not utilize hardware resources. Each of the VTALs 32 holds one or two VCPs. A VCP is a software-based entity that represents a connection point for a unidirectional traffic path originating/terminating on the same node or a unidirectional traffic path originating/terminating on a different node. The platform of the present invention also supports the creation of SNCs 34, 36. A SNC 34, 36 represents a collection of synchronous optical network (SONET)/synchronous digital hierarchy (SDH) cross-connects that define an end-to-end path through a network of nodes. A SNC 34, 36 is managed (i.e., established, maintained, and/or deleted) using the routing and signaling capabilities provided by the optical signaling and routing protocol (OSRP). A SNC 34, 36 supports various features, such as the automated creation of end-to-end connection paths via the network cloud 20 and the automated restoration of failed end-to-end connection paths (i.e., mesh restoration), among other features.

Again, NE-1 12 is co-located with a digital test set 14 including diagnostic equipment, etc., via a TAL 15. In this example, NE-1 12 is a remote test node representing a test set server, and could be located at corporate headquarters, for example. NE-2 16, which is located elsewhere, is co-located with a circuit of interest 18. In order for the digital test set 14 to access the circuit of interest 18, NE-2 16 implements a test access procedure utilizing and exploiting the VTALs 32 and SNCs 34, 36. This test access procedure involves virtually connecting the circuit of interest 18 to the VTALs 32. Likewise, the digital test set 14 is virtually connected to the SNCs 34, 36. This forms the remote test access from the digital test set 14 to the circuit of interest 18, and is akin to performing remote surgery. Of note, no physical CTPs are required. The operation of the digital test set 14, NE-1 12, and NE-2 16 are directed by the TOS 22 and a NMS 38 through a plurality of communications links 24. Again, although not specifically addressed here, the transport network may also include NE-3 26, etc., in the network cloud 20 disposed between PTE-A 28 and PTE-Z 32. The circuit of interest 18 may be located in NE-2 16, as described above, NE-3 26, or in any other node, with the methodology of the present invention remaining the same.

Again, the remote test access feature of the present invention utilizes and exploits the merge-and-split of flexible cross-connects, using the merge-and-split concept of graph theory. When the circuit of interest 18 is modified, the associated flexible cross-connects are modified and merged again. When the remote tap is mesh restored, the remaining part of the graph is modified and merged again transparently, such that the remote test "sees" only a small traffic disruption, as opposed to a complete traffic loss, as is the case with conventional test access features. Finally, the remote test access feature of the present invention supports unidirectional (and bidirectional) cross-connects and, as a result, provides monitor modes for remote testing on both the facility and equipment sides of a CTP of a circuit of interest 18.

The remote test access feature of the present invention, in addition to being used to perform a remote tap, may be used in association with sub-network connection protection (SNCP) schemes, the upgrading of a unidirectional path switched ring (UPSR)/SNCP ring to a drop-and-continue multicast ring, applications involving nested protection (i.e., path-in-a-path or line-in-a-line), and applications supporting stacked protection (i.e., path level and line level at the same time). The remote test access feature of the present invention eliminates the need to dedicate physical resources at each and every node, and significantly reduces the amount of time required to provision and configure test access, as a test access path across the network cloud 20 is automatically created.

Figure 3:
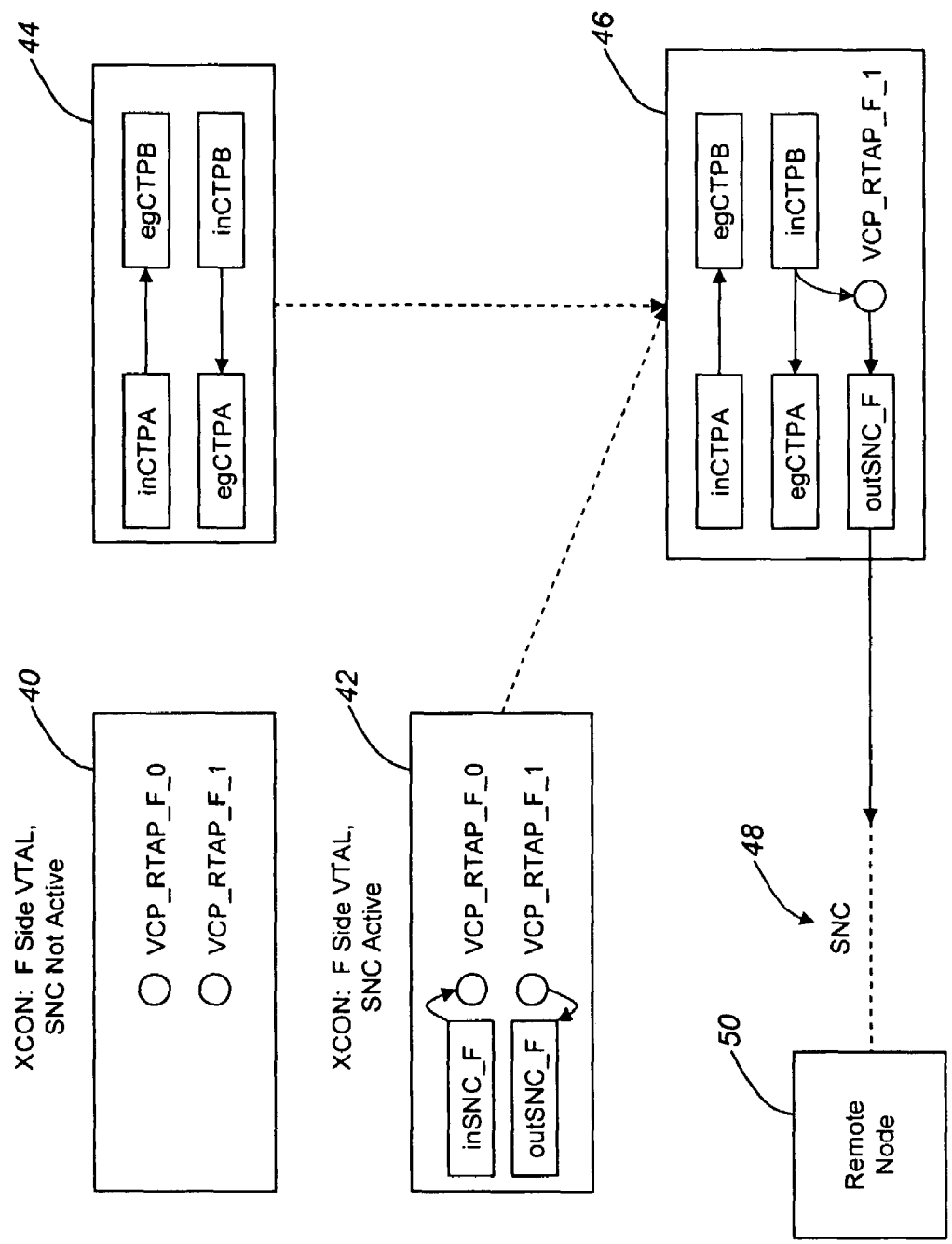
FIG. 3 is a schematic diagram illustrating the implementation of the remote test access feature of the present invention as the merger of two cross-connect (XCON) graphs.

FIG. 3 is a schematic diagram illustrating the implementation of the remote test access feature of the present invention as the merger of two XCON graphs. Referring to FIG. 3, in one embodiment, a graph represents the terminating side of a SNC to VCPs allocated for the purpose of test access (via a VTAL). Initially, only a pair of VCPs are allocated 40. After the SNC terminates at the allocated VCPs, the graph is modified 42 and provides a remote access path. Another graph represents a local XCON to be tapped/tested 44. In response to a request from the TAP subsystem to create a RTAP, the system 1) merges the two graphs to generate a new "super" XCON and 2) applies a TAP-related modification to the merged graph 46. The result of these modifications is the formation of the remote access path, via the SNC 48, to a local cross-connect for the purposes of testing at a remote node 50.

Figure 4A:
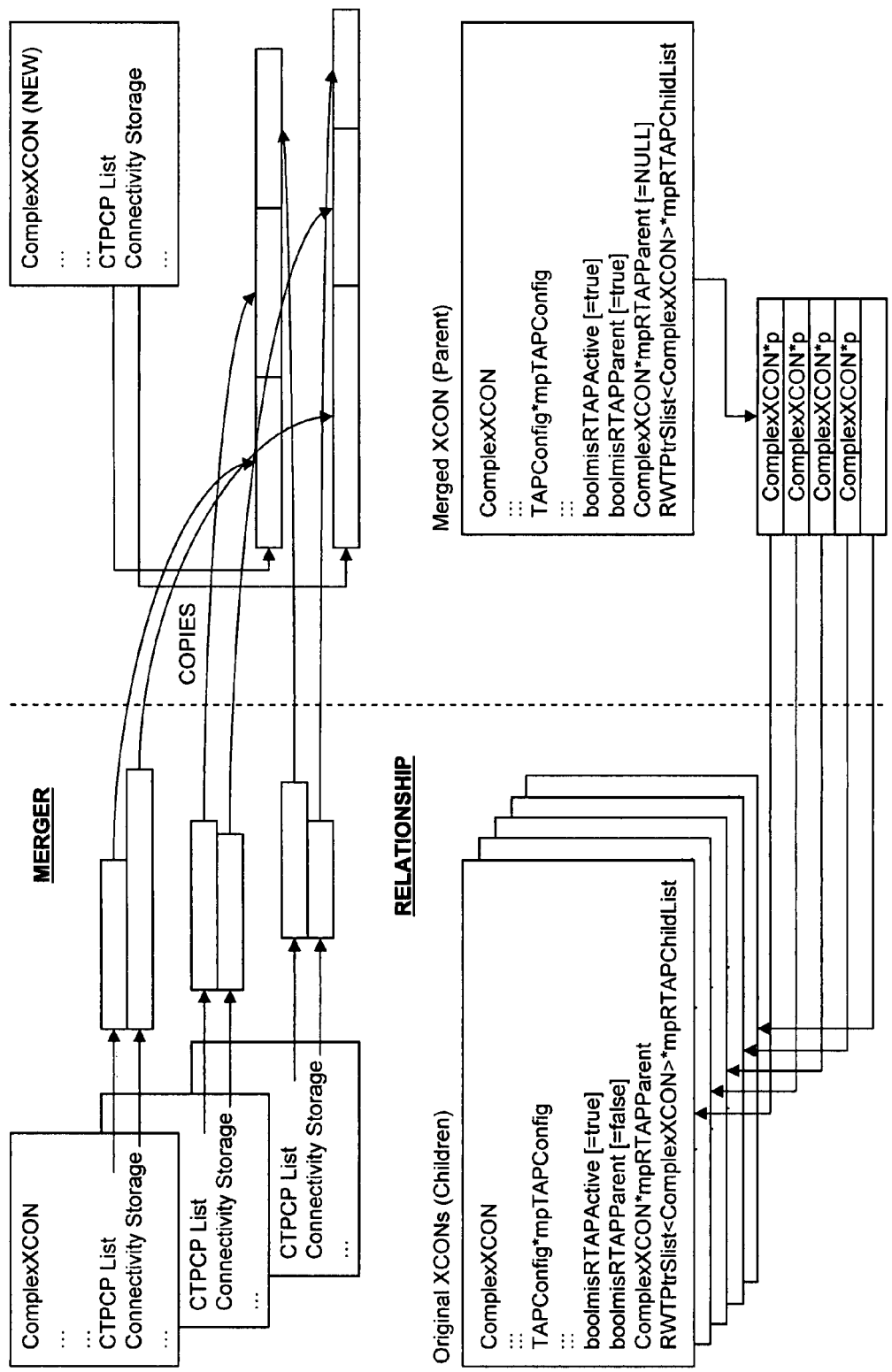
FIGS. 4a and 4b are schematic diagrams illustrating the process involved in merging two or more flexible cross-connects (merger, relationship, and event).
Figure 4B:
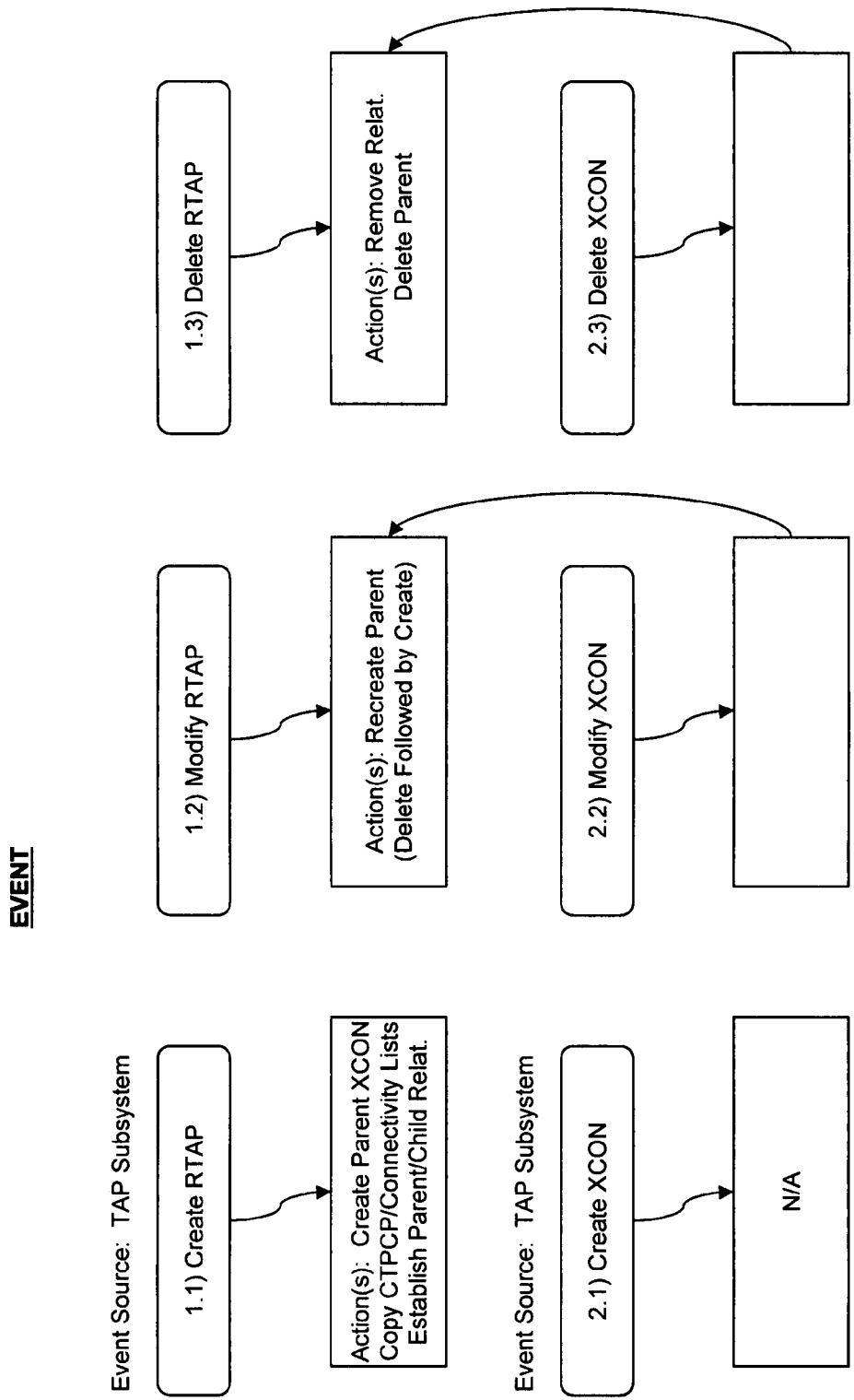

FIG. 4 is a schematic diagram illustrating the process involved in merging two or more flexible cross-connects (merger, relationship, and event). Referring to FIG. 4, in another embodiment, merging XCONs encompasses several steps. First, a list of all XCONs to be merged is created (i.e., a list of all children). Second, multi-connections are removed for each XCON, but these changes are not applied to the switch fabric in order to avoid any loss of traffic. Third, switch fabric updates are disabled for each XCON. As a result, while the "merge" is in place, the XCONs are not allowed to update the switch fabric. Fourth, a new XCON is created (i.e., a parent XCON). Fifth, the CTPCP and IOP lists of the new XCON are populated by copying content from the child XCONs. Sixth, a parent/child relationship is established by properly setting the member variables of all of the XCONs. Seventh, for each CTP and CP that is part of the parent XCON, a method that returns a pointer to the corresponding XCON is temporarily changed. While the "merge" is in place, this method returns the pointer to the parent XCON for all CTPs and CPs that are part of the parent XCON. Eighth, the parent XCON is committed and programmed into the switch fabric. This process accomplishes several objectives. First, the existing TAP infrastructure and methods are applicable, with only minor modifications, for creating the remote TAP. Second, the content of the child XCONs is preserved (i.e., the CTPCP and IOP lists are not altered). As a result, restoring the original XCONs (without the RTAP) is straightforward.

The process of establishing a remote TAP begins with a "Create RTAP" event. This event is sent from the CM/TAP subsystem to a TM/LS-NewLS subsystem. In response to the event, the NewLS subsystem executes the necessary steps to establish the remote TAP. With the remote TAP in place, the NewLS subsystem may receive either a "Modify RTAP" event from the CM/TAP subsystem, or "Modify XCON" or "Delete XCON" events from the CM/CAC subsystem. Both modification events are handled in a similar manner. The NewLS subsystem deletes the RTAP (i.e., eliminates the parent/child relationship, restores each child, deletes the parent, etc.) or creates the RTAP using a new set of RTAP parameters. Likewise, for an XCON modification request, the NewLS subsystem first determines if the XCON that is to be modified is part of the RTAP or not. If the XCON is part of the RTAP, the NewLS subsystem deletes the RTAP, restoring all children to their original states, applies the modification to the XCON, and recreates the RTAP using the same or stored RTAP data. It should be noted that applying the modification to the XCON is part of the normal processing of an XCON modification request, without the RTAP. If the NewLS subsystem receives a "Delete XCON" event for an XCON that is part of the RTAP, the NewLS subsystem deletes the RTAP parent, restoring all children to their original states, deletes the XCON, and notifies the CM/TAP subsystem of the auto-deletion of the RTAP. Receiving a "Delete RTAP" event terminates the existence of the RTAP and the parent/child relationship. Upon receiving the "Delete RTAP" event, the NewLS subsystem restores all children to their original states, deletes the parent, and then commits or programs all children into the switch fabric.

The creation of a remote TAP creates a new, merged XCON. This parent is stored in a hash list that is separate and distinct from the hash list that holds other, CAC created, XCONs. The NewLS subsystem is updated in order to support the diagnostics display of the remote TAP-related XCONs. The NewLS subsystem determines if the remote TAP hash list includes entries (i.e., remote TAP parents). If entries are present, the remote TAP parents are displayed following the display of regular (i.e., non-RTAP parent) XCONS. The remote TAP parent XCON typically has an XCONID that is the same as the XCONID of one of the remote TAP child XCONs.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A system for the implementation of a remote test access feature in a transport network using virtual connection points and sub-network connections, the system comprising:

a first network element representing a remote test node;

a second network element representing a local node to be tested, the second network element comprising a circuit to be tested;

a digital test set comprising diagnostic equipment coupled to the first network element;

one or more software-based virtual test access links coupling the first network element and the second network element via one or more local test access ports associated with the local node to be tested and the circuit to be tested, the one or more software-based virtual test access links each comprising one or more software-based virtual connection points, the one or more software-based virtual connection points each defining a connection point for a unidirectional traffic path originating/terminating on the same or a different network element; and one or more sub-network connections coupling the first network element and the second network element, the one or more sub-network connections each comprising one or more cross-connects defining an end-to-end path through the transport network.

2. The system of claim 1, further comprising a test operations system coupled to the digital test set and the remote test node via a first communications link.

3. The system of claim 1, further comprising a network management system coupled to the remote test node and the local node to be tested via a second communications link.

4. The system of claim 1, wherein the digital test set is coupled to the first network element via a hardware-based test access link.

5. The system of claim 1, wherein the one or more sub-network connections are resident in a network cloud.

6. The system of claim 1, wherein the remote test node and the local node to be tested are adjacent nodes, with no intervening nodes.

7. The system of claim 1, wherein the remote test node and the local node to be tested are not adjacent nodes, with intervening nodes.

8. A method for the implementation of a remote test access feature in a transport network using virtual connection points and sub-network connections, the method comprising:

providing a first network element representing a remote test node;

providing a second network element representing a local node to be tested, the second network element comprising a circuit to be tested;

providing a digital test set comprising diagnostic equipment coupled to the first network element;

providing one or more software-based virtual test access links coupling the first network element and the second network element via one or more local test access ports associated with the local node to be tested and the circuit to be tested, the one or more software-based virtual test access links each comprising one or more software-based virtual connection points, the one or more software-based virtual connection points each defining a connection point for a unidirectional traffic path originating/terminating on the same or a different network element; and providing one or more sub-network connections coupling the first network element and the second network element, the one or more sub-network connections each comprising one or more cross-connects defining an end-to-end path through the transport network.

9. The method of claim 8, further comprising providing a test operations system coupled to the digital test set and the remote test node via a first communications link.

10. The method of claim 8, further comprising providing a network management system coupled to the remote test node and the local node to be tested via a second communications link.

11. The method of claim 8, wherein the digital test set is coupled to the first network element via a hardware-based test access link.

12. The method of claim 8, wherein the one or more sub-network connections are resident in a network cloud.

13. The method of claim 8, wherein the remote test node and the local node to be tested are adjacent nodes, with no intervening nodes.

14. The method of claim 8, wherein the remote test node and the local node to be tested are not adjacent nodes, with intervening nodes.

15. A method for the implementation of a remote test access feature in a transport network using virtual connection points and sub-network connections, the method comprising:

providing a first network element representing a remote test node;

providing a second network element representing a local node to be tested, the second network element comprising a circuit to be tested;

providing a digital test set comprising diagnostic equipment coupled to the first network element;

providing one or more software-based virtual test access links coupling the first network element and the second network element via one or more local test access ports associated with the local node to be tested and the circuit to be tested, the one or more software-based virtual test access links each comprising one or more software-based virtual connection points, the one or more software-based virtual connection points each defining a connection point for a unidirectional traffic path originating/terminating on the same or a different network element;

wherein the one or more software-based virtual test access links are formed via the merging of a plurality of child cross-connect graphs to form a parent cross-connect graph; and providing one or more sub-network connections coupling the first network element and the second network element, the one or more sub-network connections each comprising one or more cross-connects defining an end-to-end path through the transport network.

16. The method of claim 15, further comprising providing a test operations system coupled to the digital test set and the remote test node via a first communications link.

17. The method of claim 15, further comprising providing a network management system coupled to the remote test node and the local node to be tested via a second communications link.

18. The method of claim 15, wherein the digital test set is coupled to the first network element via a hardware-based test access link.

19. The method of claim 15, wherein the one or more sub-network connections are resident in a network cloud.

20. The method of claim 15, wherein the remote test node and the local node to be tested are adjacent nodes, with no intervening nodes.

21. The method of claim 15, wherein the remote test node and the local node to be tested are not adjacent nodes, with intervening nodes.

* * * * *